United States Patent [19]
Lees

[11] Patent Number: 6,131,378
[45] Date of Patent: Oct. 17, 2000

[54] GANG MOWER

[76] Inventor: Earl K. Lees, 150 Valley View Rd., Harrisville, Pa. 16038

[21] Appl. No.: 09/264,663

[22] Filed: Mar. 8, 1999

Related U.S. Application Data

[60] Provisional application No. 60/077,434, Mar. 9, 1998.

[51] Int. Cl.$^7$ ............................. A01D 75/30; A01D 34/44
[52] U.S. Cl. .......................................... 56/7; 56/6; 56/13.6
[58] Field of Search ........................... 56/6, 7, 13.6, 13.7

[56] References Cited

U.S. PATENT DOCUMENTS

| | | | |
|---|---|---|---|
| 2,153,876 | 4/1939 | Roseman | 56/7 |
| 3,832,835 | 9/1974 | Hall et al. | 56/7 |
| 4,330,981 | 5/1982 | Hall et al. | 56/7 |
| 4,481,755 | 11/1984 | Carr | 56/7 |
| 4,570,425 | 2/1986 | Carr | 56/7 |
| 4,769,976 | 9/1988 | Basset et al. | 56/7 |
| 5,042,236 | 8/1991 | Lamusga et al. | 56/7 |
| 5,146,733 | 9/1992 | Klaeger | 56/6 |
| 5,423,565 | 6/1995 | Smith | 56/7 |
| 5,778,647 | 7/1998 | McLean et al. | 56/13.6 |
| 5,865,017 | 2/1999 | Short | 56/7 |

*Primary Examiner*—Thomas B. Will
*Assistant Examiner*—Meredith C. Petravick
*Attorney, Agent, or Firm*—Harry I. Leon; Vivian L. Steadman

[57] ABSTRACT

A gang mower mountable on a tractor and having a plurality of independently-cutting mower units whose cutting heads are individually powered by hydraulic motors. Each mower unit is suspended from the end of a support arm which can move vertically through a distance of about 12 inches, each mower unit is itself mounted beneath a swivel ball joint that allows the mower to undergo pitch, roll and yaw motions as well as the up and down movements of the support arm. Moreover, this mower suspension mechanism allows each of the mower units to hold the ground due to its own weight alone and does not require any stabilizing force to be applied through springs or otherwise. The freedom of motion of the suspension mechanism in combination with an independent drive for each mower unit yields a gang mower with a smooth, wide-cut mowing action. Further, about half the mower units are mounted on foldable frame members, allowing the gang mower to pass through gates designed for auto travel and at the same time have a cutting width while in use as large as 19 feet. When the mower is attached to a suitable tractor, an operation which yields a near perfect cutting of turf at the rate of 15 acres per hour is easily accomplished.

6 Claims, 8 Drawing Sheets

GANG MOWER

CROSS-REFERENCE TO RELATED APPLICATION

Applicant claims the benefit under 35 U.S.C. 119(e) of provisional application Ser. No. 60/077,434, filed Mar. 9, 1998.

BACKGROUND OF THE INVENTION

The use of a tractor to drive multiple mower units is well documented in the patent literature. As early as 1925, Seeley, in U.S. Pat. No. 1,556,965, disclosed such a tractor lawn mower. Seeley's combination has multiple reel type mower units; and each unit therein has its own independent ground contact drive.

Moyer, in U.S. Pat. No. 1,900,726, which issued Mar. 7, 1933, discloses an improvement of Seeley's gang mower in which a short couple is provided between the tractor and each ground driven mower. Moyer's mower also includes a set of springs which are used to push draw bars holding the mowers to the ground, so that they can be held in contact with it whether or not the ground is uneven.

Arnold, in U.S. Pat. No. 4,370,846, which issued Feb. 1, 1983, discloses a gang mower having a mounting frame which is raised by the action of a single hydraulic cylinder.

SUMMARY OF THE INVENTION

The object of this invention is to provide a fast but smooth-running, heavy duty cutting machine suitable for mowing large grassy areas such as a golf course.

A further object of the present invention is to provide such a machine which is easy to use and has a small turning radius.

A still further object of the present invention is to provide such a machine which is both reliable and easy to repair.

A still further object of the present invention is to provide a gang mower which not only is useful for mowing wide strips of grass uniformly, quickly and easily but also is reasonably priced, has a long service life and is easy to maintain.

According to this invention, there is provided a gang mower which comprises a plurality of mowers, a hydraulic motor on each mower, a foldable support structure and means for pivotally connecting the support structure to the frame of a tractor. The tractor on which the gang mower is mounted is preferably one which has a hydraulic pump, built into the tractor engine by its manufacturer, and a frontal power take-off shaft. Numerous tractor models designed for agricultural use as windrowers are so equipped. The single hydraulic pump and power take-off shaft on the tractor are used to supply pressurized hydraulic fluid to power the hydraulic motors on the individual mowers, thereby eliminating the need for an out-front hydraulic pump and tank on the gang mower.

Each mower includes a hydraulically-driven, reel-type cutting head. Each cutting head cuts a swath which measures, by way of example, approximately 26 inches in width. By utilizing a newer model tractor and multiple mowers in a gang mower according to the present invention, one can cut swaths ranging in width from 15 to 26 feet at a rate of up to 10 to 20 acres per hour. In the preferred embodiment, the gang mower has 9 cutting heads with a combined cutting width of 19 feet and can cut from 8 to 18 acres per hour depending upon the cutting conditions. A slightly smaller version of this embodiment can be achieved by removing two end mowers so that only 7 cutting heads remain.

The mower units are attached to the tractor as follows:

(1) The foldable support structure includes a centrally disposed horizontal beam rigidly attached to a pair of arms, each of which is connected to a mounting port on the tractor. Distal from its connection with one of the arms, each mounting port is pivotally connected to the tractor frame and can be raised or lowered by actuating one of a first pair of hydraulic cylinders attached to the mounting port and to the mid frame of the tractor. The horizontal beam can be raised with the use of this first pair of hydraulic cylinders.

(2) In addition to the horizontal beam, the support structure includes right and left end frame members pivotally connected to the distal ends of the horizontal beam. Also pivotally connected to the right and left end frame members is a second pair of hydraulic cylinders, each of which links a bracket attached to one of the end frame members with the nearest unit of a pair of spaced-apart brackets attached to the upper surface of the horizontal beam. With the use of the second pair of hydraulic cylinders, the right and left end frame members can be rotated upwardly about their respective pivotal connections with the horizontal beam.

(3) A mower support arm for each of the mowers is pivotally connected to the support structure in such a manner as to allow the support arm to move freely in a vertical plane. In the preferred embodiment, the free end of the support arm can move up and down along a distance which measures, by way of example, about 12 inches.

(4) Each of the mower units has a swivel mount located on its upper frame, and this swivel mount is joined by a single bolt to the end of the mower support arm distal from the support structure. With this swivel mount, each mower unit is free to move up and down as well as pitch, roll and yaw independently of the movement of any other mower unit or the tractor.

For ease of blade sharpening and other maintenance activities, a mower unit can be removed from the tractor by simply disconnecting the hydraulic hose to the motor powering the unit and then unfastening a single bolt holding the swivel mount to the mower support arm for the unit.

Because individual mower units within the mower are independently mounted, allowing each mower unit to follow the contours of a field, the gang mower according to the present invention is a major improvement over the prior art. Moreover, the individual mower units in this gang mower adjust to field contours when they are acted on by the force of gravity alone.

In the preferred embodiment of the mower, its centrally-disposed horizontal beam supports five mower units directly and the left and right end frame members, which in use extend longitudinally therefrom, support two mower units apiece. Alternately, in an embodiment having only 7 mower units, the left and right end frame members support only one mower unit apiece. A similar mechanical linkage is employed in each instance for mounting an individual mower unit wherever it is disposed beneath the support structure, whether the unit is located proximate with the horizontal support beam or one of the two end frame members. By actuating the second pair of hydraulic cylinders, the right and left end frame members can be rotated upwardly and the mower units supported thereby can be raised.

Further, all of the mower units can be raised by lifting the horizontal beam with the use of the first pair of hydraulic cylinders. Each of the mower units can removed from the tractor by disconnecting the hydraulic line to the mower unit and by removing two bolts which hold the hydraulic motor thereto and one bolt which secures the mower unit to its respective mower support arm.

In operation, a prototype of the improved gang mower having nine cutting heads has been used to cut a 19 foot wide strip at the rate of 15 acres per hour. This gang mower not only cuts at a rapid rate but also does a superior job due to its unique mower suspension system which allows each individual mower enough freedom of motion to pitch about 6 inches up and down, to roll about 30 degrees to each side and to yaw about 30 degrees. With this freedom of motion, individual mowers closely follow contours in the ground surface.

Moreover, in the preferred embodiment, each mower unit weighs about 80 pounds, an optimum weight for the mowers which allows each of them to hold the ground due to its own weight alone as it is being run across a turf surface. As a result, springs are not needed to maintain contact between the mower units and the grass being cut.

Further, because each mower has its own hydraulic motor drive, each mower can continue cutting the grass, regardless of the spatial orientation of the mower unit. This independent motor drive, in combination with the freedom of motion of the suspension mechanism for each mower unit, yields a gang mower with a smooth, wide-cut mowing action. In actual tests, the improved gang mower, when used to cut a golf course at a rate of 15 acres per hour, gave the grass a cut which looked nearly perfect.

DETAILED DESCRIPTION OF THE PREFERRED EMBODIMENT

Referring to the drawings, a gang mower, indicated generally by the reference numeral 10, comprises a support structure having a centrally-disposed horizontal beam 16 and end frame members 17, 18 pivotally connected thereto. Rigidly attached to the beam 16 is a pair of arms 11, 12, which can be mounted on a tractor 50.

As shown in the drawings, a prototype of the gang mower 10 is mounted on a 65 horsepower, gas engine Owatonna Model No. 260. This Owatonna tractor has front wheel steering and caster rear wheels which give it a turning radius of about zero. Other suitable tractors are the following diesel-powered units: Ford New Holland Models 2450 and 2550 which have 87 horsepower and 100 horsepower engines, respectively; Case I.H. Models 8820 and 8830 which have 75 horsepower engines, Model 8840 which has a 98 horsepower engine and Model 8850 which has a 150 horsepower engine; John Deere Model 4890 which has a 100 horsepower engine. Each of these tractors has its own hydraulic pump which is factory built into its engine, thus eliminating the need for an out-front hydraulic pump and tank.

Figure 10:
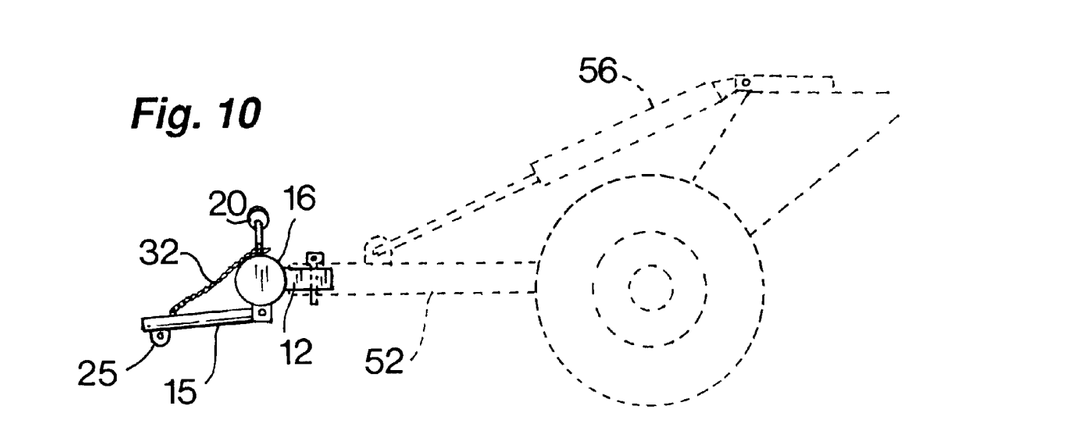
FIG. 10 shows the left end view of the support structure in the gang mower according to FIG. 1 as well as a mower support arm, the mower support being shown without any mower attached thereto.
Figure 12:
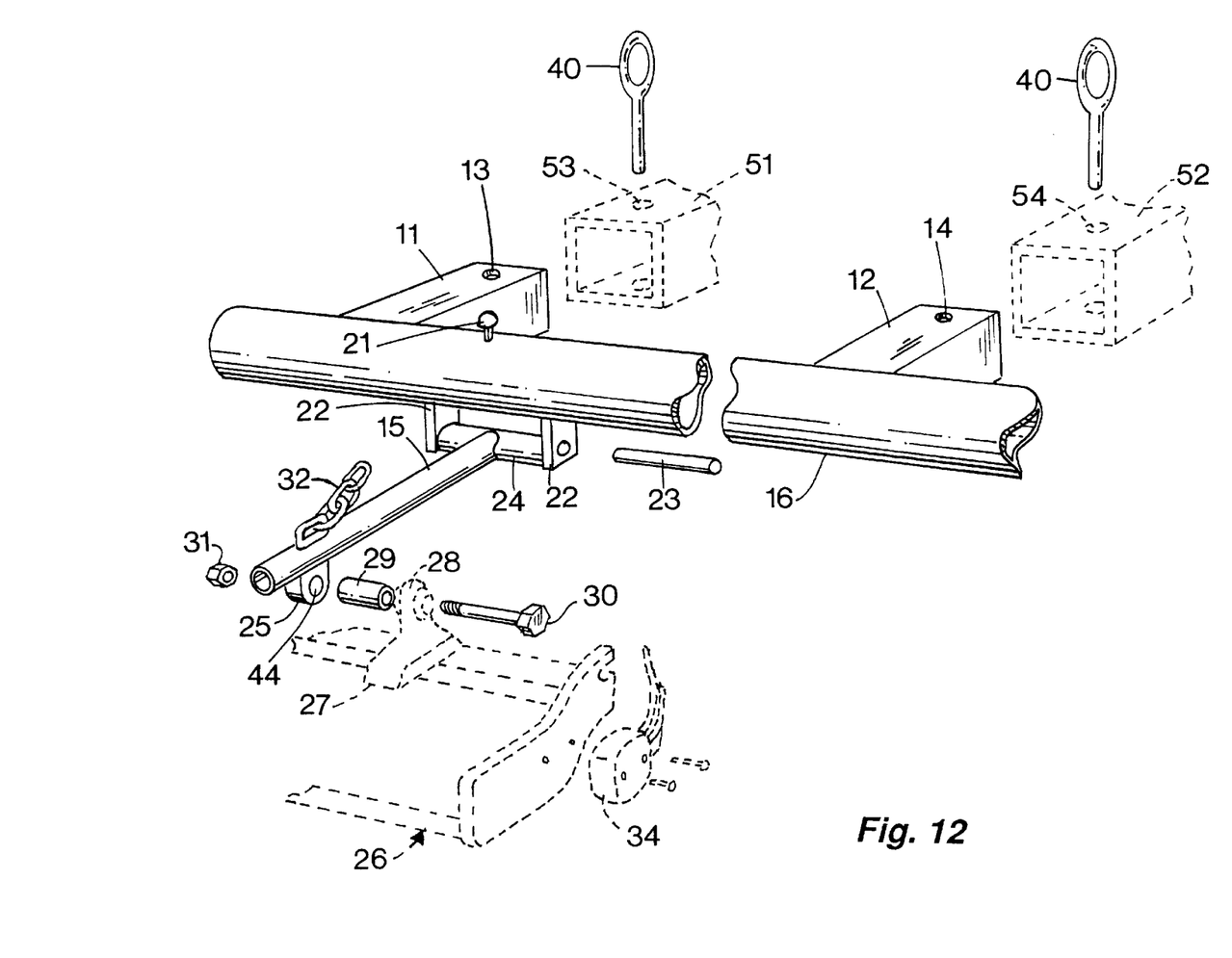
FIG. 12 shows an exploded view, in perspective and on enlarged scale, of the mower support arm and of fragmentary portions of the support structure in the gang mower according to FIG. 1, including the mounting arms on the support structure which are attachable to a tractor, fragmentary portions of the tractor mounting ports and of the mower unit being shown in dashed lines, the mounting ports forming no part of the invention.
Figure 13:
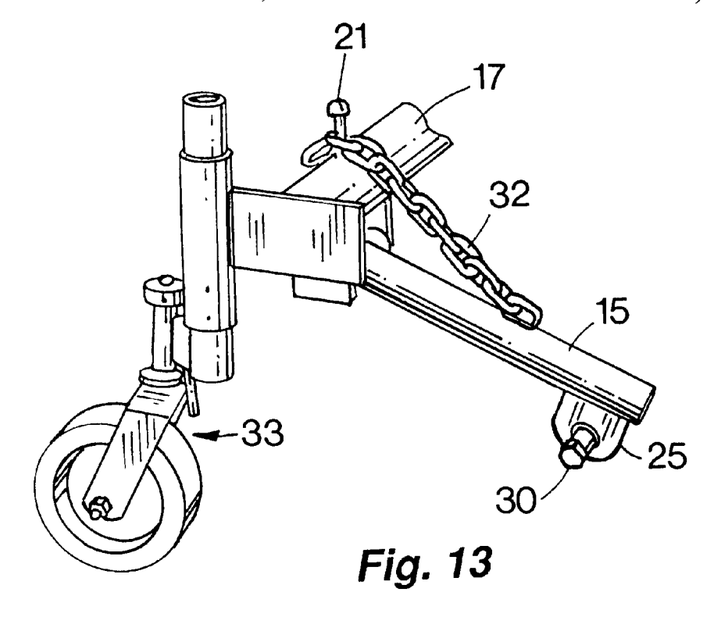
FIG. 13 shows an enlarged left end perspective view of a fragmentary portion of the support structure, an end caster wheel connected thereto, and one of the mower support arms in the gang mower according to FIG. 1, the mower support arm being shown without any mower attached thereto.
Figure 14:
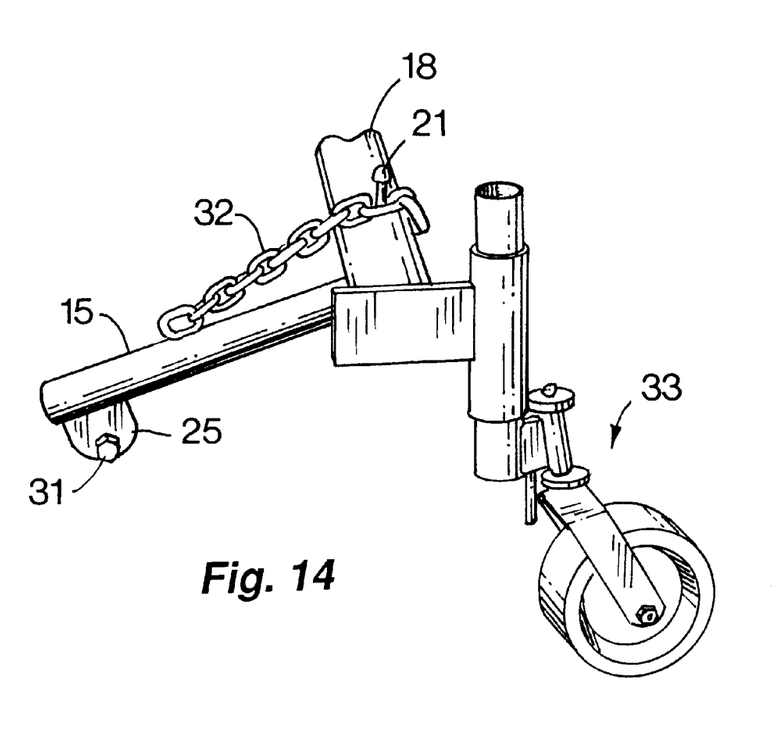
FIG. 14 shows an enlarged right end perspective view of a fragmentary portion of the support structure, an end caster wheel connected thereto, and one of the mower support arms in the gang mower according to FIG. 1, the mower support arm being shown without any mower attached thereto.

In use, the mounting arms 11, 12, which are tubular in cross-section, are slip-fitted into mounting ports 51, 52, respectively, on the tractor (FIGS. 10, 12). Each mounting arm 11, 12 is preferably fabricated from a 3 inch square tubular member measuring about 12 inches in length and slidable into a port 51, 52, which is hollow and has about a 4-inch square cross-section. Lock pins 40, which are inserted through holes 53, 54 formed in the tractor frame and into holes 13, 14 defined by the mounting arms 11, 12, respectively, are used to hold these arms and the mounting ports 51, 52 in assembled relation (FIG. 12).

Figure 1:
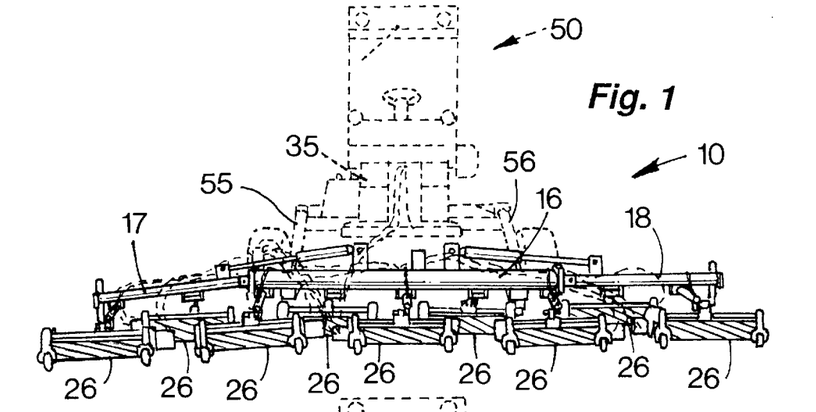
FIG. 1 is a frontal perspective view of a tractor with an improved gang mower in accordance with the present invention being attached thereto, the gang mower holding nine mower units; the tractor which is shown in dashed lines forming no part of said invention.
Figure 2:
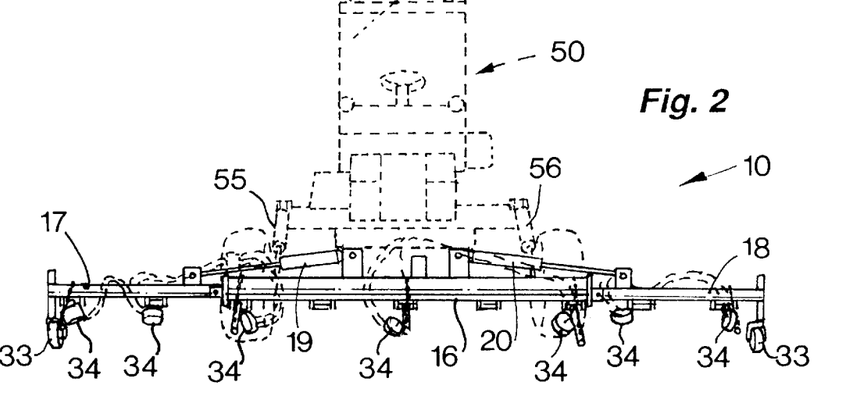
FIG. 2 is a frontal view of the support structure of the gang mower according to FIG. 1, the support structure of the gang mower being shown in a lowered position and without any mower units attached thereto.
Figure 3:
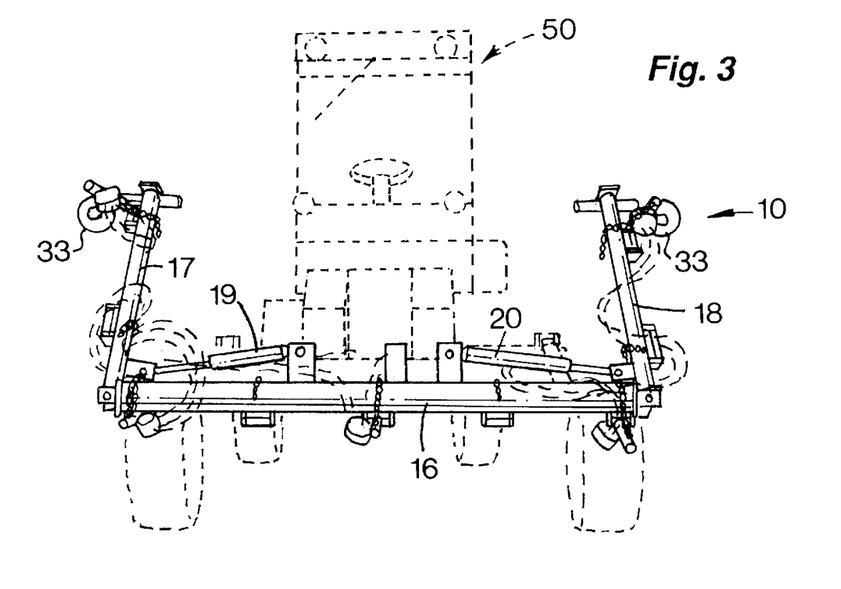
FIG. 3 is a frontal view of the support structure of the gang mower according to FIG. 1, the support structure of the gang mower being shown in a folded, raised position and without any mower units attached thereto.
Figure 4:
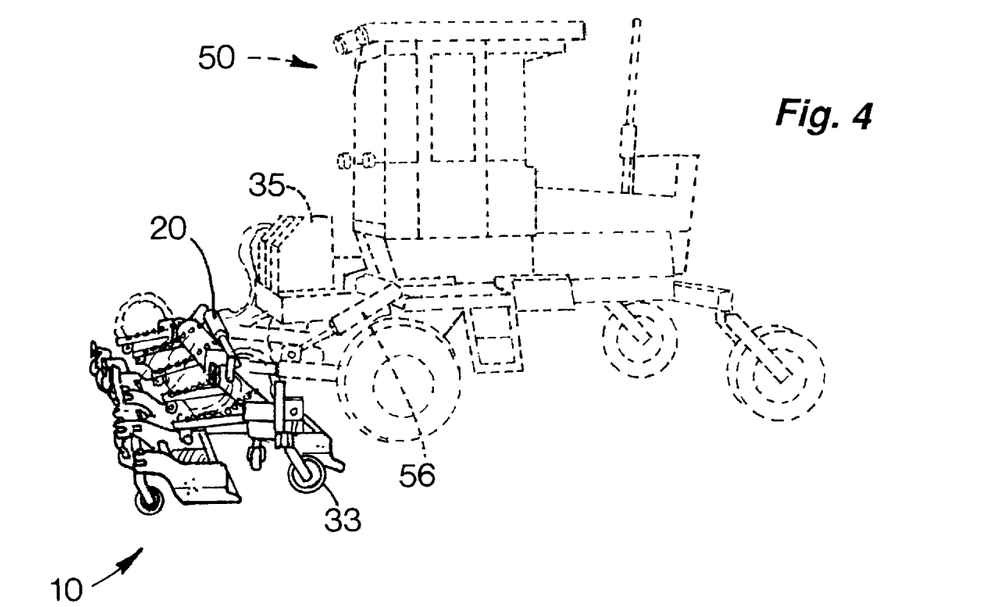
FIG. 4 is a left side perspective view of the gang mower according to FIG. 1, the mower units being shown in a lowered position.
Figure 5:
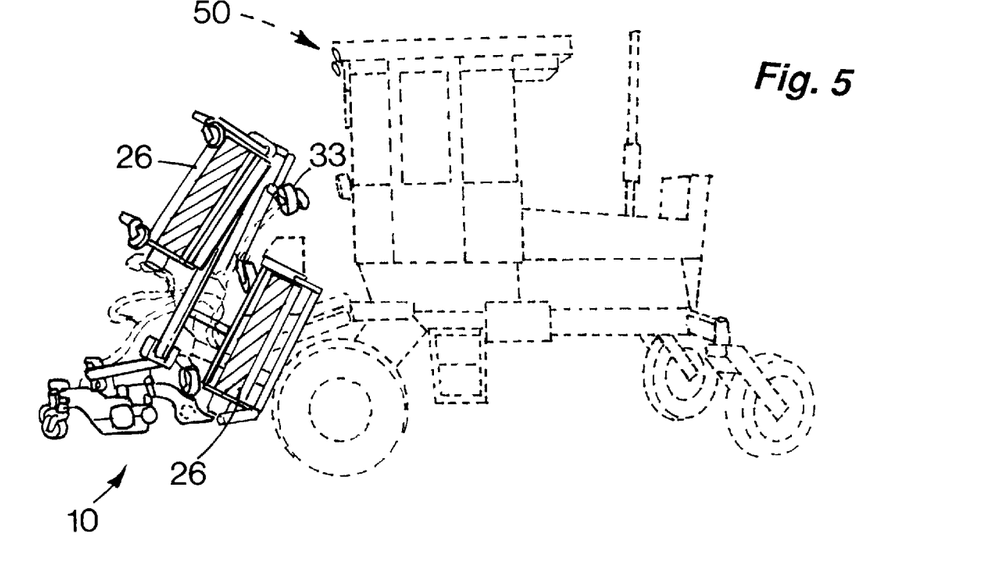
FIG. 5 is a left side perspective view of the gang mower according to FIG. 1, the mower units being shown in a raised and folded position.
Figure 6:
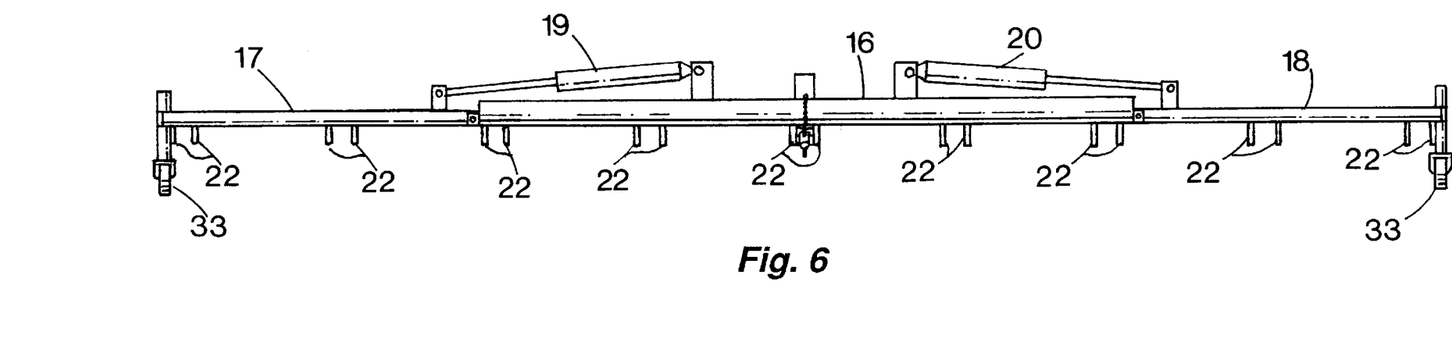
FIG. 6 shows a front view of the support structure in the gang mower according to FIG. 1, the support structure being shown, for ease of illustration, with only one mower support arm and without the mower units attached thereto.
Figure 7:
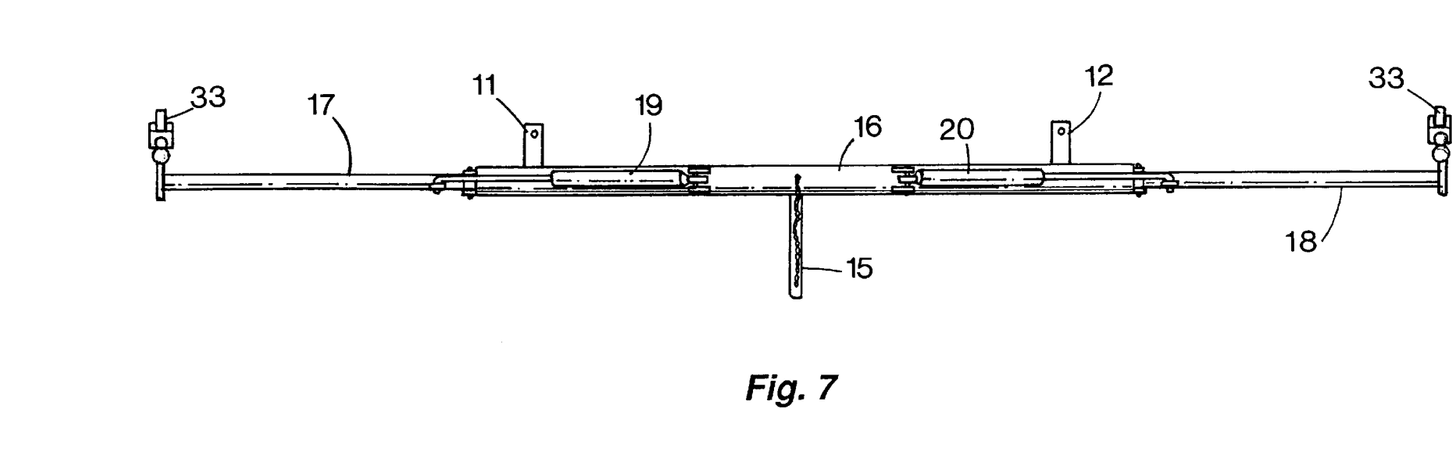
FIG. 7 shows a plan view of the support structure in the gang mower according to FIG. 1, the support structure being shown, for ease of illustration, with only one mower support arm and without the mower units attached thereto.

The support structure can be raised or lowered with the use of two hydraulic cylinders 55, 56 on the tractor which change the elevation of mounting ports 51, 52, respectively, relative to the ground (FIG. 10). The end frame members 17, 18, which are pivotally connected to the centrally-disposed horizontal beam 16, can be moved upwardly and inwardly, thereby partially folding the support structure and narrowing its overall length (FIGS. 3, 5). In its preferred embodiment, the support structure has an overall length of about 9 feet so that the gang mower 10 can easily pass through driveway gates and into storage sheds. In order to facilitate moving the end frame members 17, 18, about their respective joints with the beam 16, distal ends of hydraulic cylinders 19, 20 are pivotally attached to the horizontal support beam 16 and to the end frame members 17, 18, respectively (FIGS. 3, 6, 7).

Figure 8:
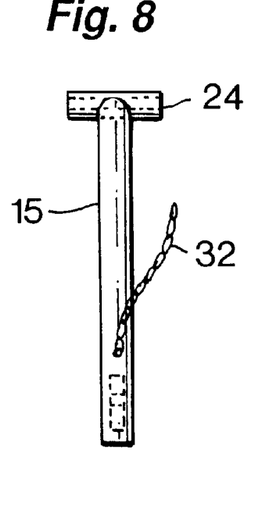
FIG. 8 shows a top plan view of one of the mower support arms in the gang mower according to FIG. 1, the mower support arm being shown removed from the gang mower with only a fragmentary portion of chain attached thereto.
Figure 9:
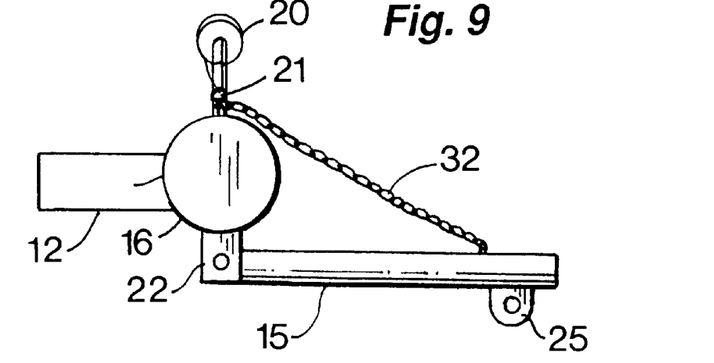
FIG. 9 shows a side view of the support structure and of one of the mower support arms in the gang mower according to FIG. 1, the mower support arm being shown without any mower attached thereto.

Mounted on the underside of the support structures 16, 17, 18 are a plurality of shafts 23 held in place by bearing blocks 22. Pivotally connected to each shaft 23 is a bearing member 24 to which is rigidly attached one of a plurality of mower support arms 15 (FIGS. 6, 9, 10, 12). In the preferred embodiment, the mower support arms 15 are fabricated from steel tubing which measures, by way of example, about 2 inch in diameter and about 18 inches long (FIG. 8). At points on each support arm 15 distal from the bearing member 24, a small plate 25, which preferably measures about 2 inches wide and ¾ thick, is welded to the underside of the arm. The plate 25 itself has a hole 44 formed therein which extends perpendicularly to the longitudinal centerline of the support arm 15 (FIG. 12).

Figure 11:
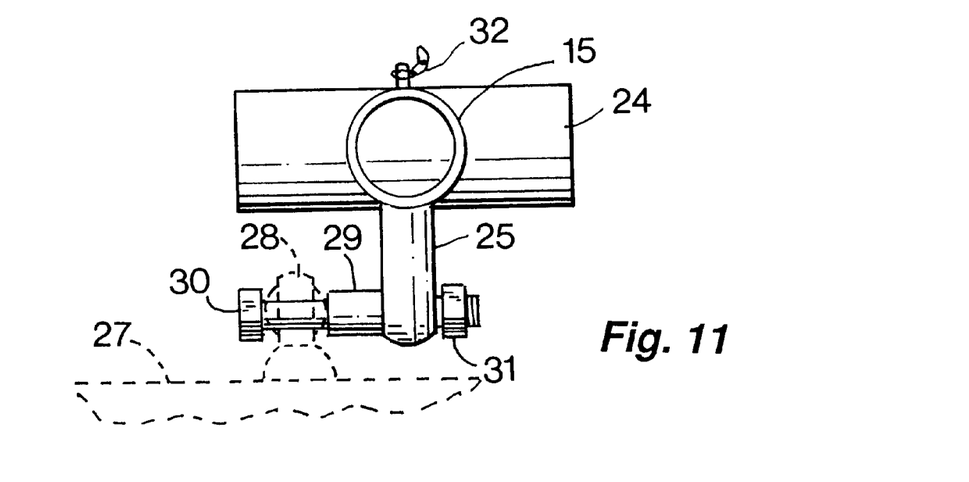
FIG. 11 shows an enlarged frontal view of one of the mower support arms in the gang mower according to FIG. 1, a fragmentary portion of one of the mower units and the swivel mount attached thereto being shown, for ease of illustration, in dashed lines.
Figure 15:
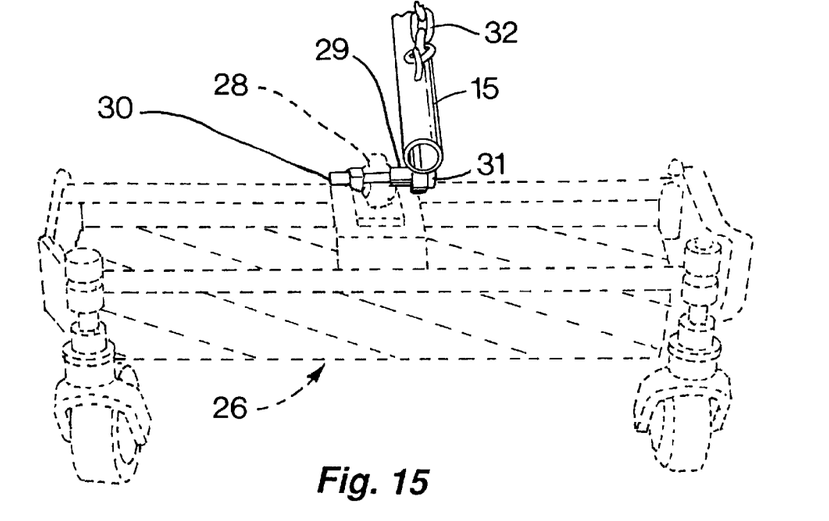
FIG. 15 shows an enlarged frontal view of fragmentary portions of one of the mower support arms and the chain attached unit thereto in the gang mower according to FIG. 1, one of the mower units and the swivel mount attached thereto being shown, for ease of illustration, in dashed lines.

Means for suspending a mower unit 26 laterally from each of the plates 25 comprises a top mounting bracket 27 rigidly attached to the mower unit, a freely movable hollow swivel ball joint 28 mounted in the bracket, a spacer washer 29 and a mower mounting bolt 30 (FIG. 11, 12, 15). In assembled relation, the bolt 30 is threaded through the swivel ball joint 28, the spacer washer 29, and the hole 44 in the plate 25 and secured by a locking nut 31 (FIG. 12).

Figure 17:
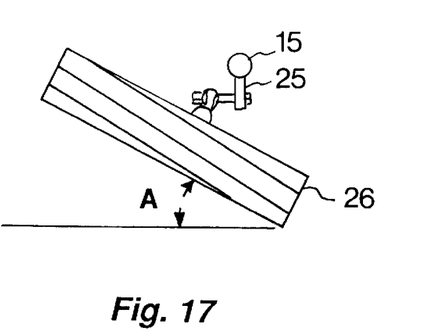
FIG. 17 shows a schematic pictorial of the maximum degree A of roll of a mower unit in the gang mower according to FIG. 1, where A is about 30 degrees.
Figure 18:
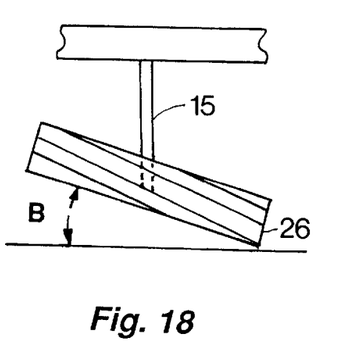
FIG. 18 shows a schematic pictorial of the maximum degree B of yaw of a mower unit in the gang mower according to FIG. 1, where B is about 30 degrees.
Figure 19:
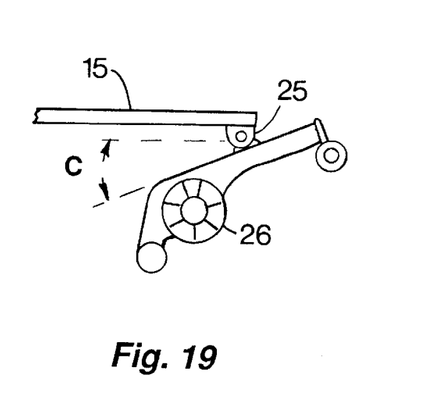
FIG. 19 shows a schematic pictorial of the maximum degree C of pitch of a mower unit in the gang mower according to FIG. 1, where C is about 20 degrees.

The spacer washer 29, which preferably measures about 1 inch in length, is sized so as to allow the cutting head of the mower unit 26 to rotate about the swivel ball joint 28 through an angle C, A, B of as much as 20 degrees, 30 degrees, 30 degrees, respectively, with each pitch, roll or yaw motion, thereby providing a high degree of freedom of motion for the swivel ball joint (FIGS. 17, 18, 19). As a result, each mower unit 26 can reorient itself readily and accurately track changes in the contours of site, thereby providing a gang mower 10 which can be used to cut a golf course or similar grass turf to a high level of uniformity.

Figure 20:
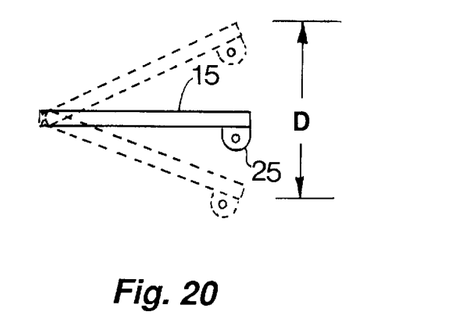
FIG. 20 shows a schematic pictorial of the maximum length D of up and down movement of each mower support arm in the gang mower according to FIG. 1, where D is about 12 inches.

To limit the vertical movement of each support arm 15, one end of a chain 32 is rigidly attached to the upper side of the support arm at points proximate with the plate 25 (FIGS. 9, 10, 13, 14, 20). The other end of the chain 32 is then adjustably attached to a pin 21 on the upper side of the particular support structure member 16, 17, 18 to which the individual support arm 15 is pivotally connected. In the preferred embodiment, the free end of the support arm 15 can move up and down a distance D which measure, by way of example, about 12 inches (FIG. 20).

Figure 16:
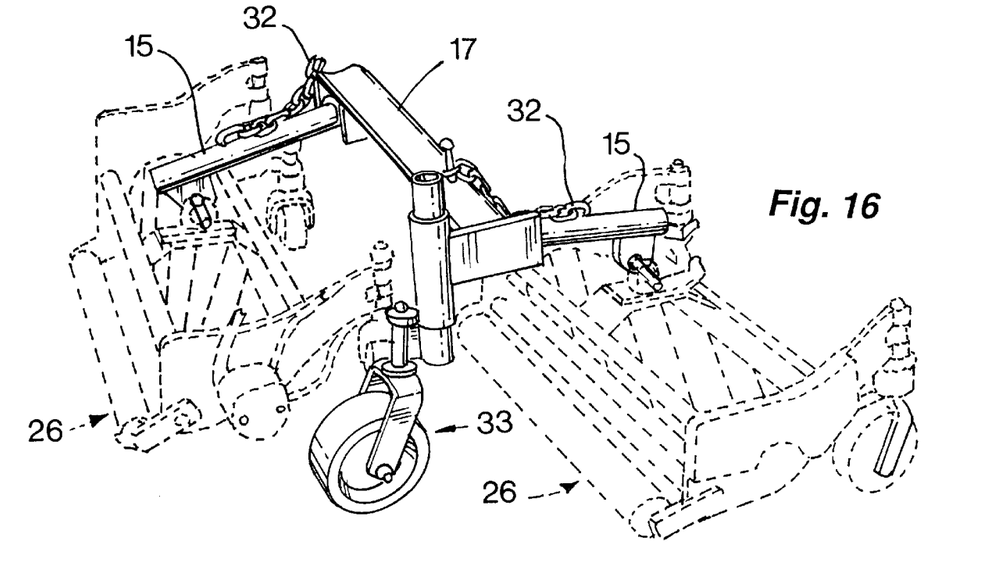
FIG. 16 shows an enlarged right end perspective view of the support structure and of an end caster wheel connected thereo in the gang mower according to FIG. 1, two mower units being shown, for ease of illustration, in dashed lines.

In the preferred embodiment, five bearing blocks 22 are attached at evenly spaced apart intervals along the underside of the centrally disposed horizontal beam 16 (FIG. 6). The blocks 22 are preferably mounted at the intervals which measure about 26 inches in length when the mower units 26 have about 30 inch-wide cutting heads. With such a configuration of the blocks 22, three of the mower support arms 15 are attached facing forwardly and two of the support arms facing rearwardly (FIG. 16). By suitably staggering the mower units 26 so that they alternately face forwardly and rearwardly, one can position the mowers to cut overlapping swaths, insuring a superior turf cutting action.

Similarly, in the preferred embodiment, two mower units 26 are installed on each of the end frame members 17, 18. To help support the end frame members 17, 18, caster wheels 33 are mounted near the distal end of each of them (FIGS. 2, 3, 4, 6, 7, 13, 14, 16).

Energy is supplied to each mower unit 26 by its individual hydraulic motor 34 (FIGS. 3, 12). The tractor's external hydraulic pump 35 supplies the power for these motors 34. The tractor's internal hydraulic pump supplies the power for the four hydraulic cylinders 19, 20, 55, 56 used to adjust the positions of the horizontal beam 16 and the end frame members 17, 18 (FIGS. 1, 2, 3, 4, 6, 7, 10). On newer model tractors the internal hydraulic pumps are capable of supplying power to both the hydraulic mower units 34 and the hydraulic cylinders 19, 20, 55, 56.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. A gang mower for mowing a turf surface, comprising:
   (a) at least one reel-type mower head;
   (b) an elongated support arm;
   (c) a single pivot joint between the mower head and the elongated support arm, the pivotal joint including a swivel ball joint on the mower head; and
   (d) means for suspending the mower head at a distance laterally from one end of the support arm, the suspending means including an elongated spacer washer juxtaposed between the swivel ball joint and the support arm, the spacer washer being of sufficient length so as to allow the mower head to rotate about the swivel ball joint about 30 degrees with each roll and yaw motion.

2. The gang mower according to claim 1, which further comprises a support structure, a portion of the support arm distal from said one end thereof being pivotally connected to the support structure; said one end of the support arm being movable vertically through a distance which is about 12 inches in length.

3. The gang mower according to claim 2 which further comprises means for adjustably limiting the travel of said one end of the support arm, the limiting means including a flexible chain.

4. The gang mower according to claim 2 which further comprises at least one hydraulic motor, each mower head being driven independently by its own hydraulic motor; each mower head being held in contact with the turf surface by its own weight alone.

5. The gang mower according to claim 1 which further comprises:

(a) a small plate rigidly attached to said end of the support arm, the plate having a hole formed therein which is disposed perpendicularly to the longitudinal centerline of the support arm;

(b) a top mounting bracket rigidly attached to the mower head;

(c) the swivel ball joint being mounted in the bracket and disposed generally midway between distal ends of the mower head;

(d) a mower mounting bolt with a bolt head and shank, the bolt shank being slidably fitted through the swivel ball joint, the elongated spacer washer, and said hole in the plate, the elongated spacer washer being of greater length than its through diameter but substantially shorter than the bolt shank;

(e) means for securing the bolt, the swivel ball joint, the elongated spacer washer and the plate in assembled relation, so that the mower head is not only supported by the arm but also has substantial freedom to undergo pitch, roll, and yaw movements on its own.

6. A gang mower removably mountable on front of a rear wheel-steering tractor for mowing a turf surface, comprising:

(a) at least one reel-type mower head;

(b) at least one hydraulic motor, the mower head being driven independently by its own hydraulic motor; each mower head being held in contact with the turf surface by its own weight alone;

(c) a support structure having at least one bearing block mounted thereon which extends downwardly therefrom;

(d) an elongated support arm having a bearing member disposed perpendicularly to the centerline of the arm, the bearing member and the bearing block having a common shaft, so that the support arm can rotate about the shaft;

(e) the elongated support arm including a small plate rigidly attached thereto distal from the bearing member, the plate having a hole formed therein which extends perpendicularly to the longitudinal centerline of the support arm;

(f) a freely movable hollow swivel ball joint mounted on the mower unit, the swivel ball joint being disposed generally midway between distal ends of the mower unit;

(g) an elongated spacer washer;

(h) a mower mounting bolt with a head an a shank, the bolt shank being slidably fitted through the swivel ball joint, the elongated spacer washer, and said hole in the plate, the elongated spacer washer being juxtaposed between the plate and the ball joint and being of greater length than its through diameter; and (i) means for securing the bolt, the swivel ball joint, the spacer washer and the plate in assembled relation, so that the mower unit is not only supported by the arm but also has substantial freedom to undergo pitch, roll, and yaw movements even as the plate on the support arm moves up and down along an arc about the shaft, thereby allowing the gang mower to follow closely contours in the turf surface.

* * * * *